US008164268B2

United States Patent
Wei

(10) Patent No.: US 8,164,268 B2
(45) Date of Patent: Apr. 24, 2012

(54) LIGHTING DEVICE IMPLEMENTED THROUGH UTILIZING INSULATING TYPE PIEZOELECTRIC TRANSFORMER IN DRIVING LIGHT-EMITTING-DIODES (LEDS)

(75) Inventor: Tao-Chin Wei, Taipei (TW)

(73) Assignees: Midas Wei Trading Co., Ltd., Taipei (TW); Champion Elite Company Limited, Tortola (VG)

( * ) Notice: Subject to any disclaimer, the term of this patent is extended or adjusted under 35 U.S.C. 154(b) by 245 days.

(21) Appl. No.: 12/629,689

(22) Filed: Dec. 2, 2009

(65) Prior Publication Data
US 2011/0018458 A1 Jan. 27, 2011

(30) Foreign Application Priority Data
Jul. 24, 2009 (TW) ................ 98125103 A

(51) Int. Cl.
*H05B 37/02* (2006.01)
(52) U.S. Cl. .............. 315/209 PZ; 315/291; 315/276; 315/312; 315/169.1; 310/318; 310/358; 310/366; 310/367
(58) Field of Classification Search .......... 310/318, 310/321, 358, 366, 367; 315/209 PZ, 276, 315/244, 312, 318, 169.1, 209 R, 291
See application file for complete search history.

(56) References Cited

U.S. PATENT DOCUMENTS

| | | | | |
|---|---|---|---|---|
| 5,969,954 A * | 10/1999 | Zaitsu | ................ | 363/16 |
| 6,134,133 A * | 10/2000 | Noma et al. | ............... | 363/134 |
| 6,172,446 B1 * | 1/2001 | Kanayama et al. | .......... | 310/348 |
| 6,229,720 B1 * | 5/2001 | Noma et al. | ............... | 363/40 |
| 6,914,365 B1 * | 7/2005 | Chou et al. | ............... | 310/318 |
| 7,902,763 B2 * | 3/2011 | Wei et al. | ............... | 315/209 PZ |
| 2009/0309460 A1 * | 12/2009 | Wei et al. | ............... | 310/359 |

FOREIGN PATENT DOCUMENTS
JP 5-160460 A * 6/1993
* cited by examiner

*Primary Examiner* — Haiss Philogene
(74) *Attorney, Agent, or Firm* — Muncy, Geissler, Olds & Lowe, PLLC

(57) ABSTRACT

A lighting device implemented through utilizing an insulating type piezoelectric transformer in driving light-emitting-diodes (LEDs), comprising at least said insulating type piezoelectric transformer connected to an LED module, a primary side of said insulating type piezoelectric transformer is used to receive a pulse voltage, and that is converted into an AC voltage in a piezoelectric voltage transformation way, and said AC voltage is output from a secondary side of said insulating type piezoelectric transformer to said LED module in proceeding with lighting function. Due to its various advantages of small leakage current, good insulation capability, high voltage endurance, low operation temperature, compact size, thin profile, high energy conversion efficiency, said insulating type piezoelectric transformer can be used to not only raise lighting efficiency, but also reduce overall size of said lighting device.

8 Claims, 9 Drawing Sheets

LIGHTING DEVICE IMPLEMENTED THROUGH UTILIZING INSULATING TYPE PIEZOELECTRIC TRANSFORMER IN DRIVING LIGHT-EMITTING-DIODES (LEDS)

BACKGROUND OF THE INVENTION

1. Field of the Invention

The present invention relates to a lighting device implemented through utilizing an insulating type piezoelectric transformer in driving light-emitting-diodes (LEDs), and in particular to a lighting device implemented through utilizing an insulating type piezoelectric transformer in raising power conversion efficiency, so as to optimize the lighting efficiency of the light-emitting-diodes (LEDs).

2. The Prior Arts

In recent years, the tendency of development of information-related products is toward light weight, thin profile, and compact size, so that it is becoming increasingly popular and common in utilizing piezoelectric transformer in driving backlight unit of liquid crystal display (LCD). The basic design principle of piezoelectric transformer is that: the energy exchange and conversion effects between electrical field and mechanical field are used to transform power voltage, thus it has the various advantages of compact size, light weight, high electrical energy conversion efficiency, high reliability, high insulation capability, and without electromagnetic interference (EMI) radiation. However, as the primary side of the piezoelectric transformer is used to receive a driving voltage and output a voltage with a transformation ratio from a secondary side, and in case that the piezoelectric transformer is driven by signals at a non-resonance frequency range, then the piezoelectric transformer tends to produce parasitic oscillations. In this way, the secondary side may output power of non-resonance frequency, yet it will consume energy and lower the power conversion efficiency of piezoelectric transformer.

In the prior art, a piezoelectric transformer achieves insulation of its primary side and secondary side by means of a conventional coil-winding type transformer. Since a coil-winding transformer may produce sine wave output voltage higher than that of the input voltage, therefore, sine wave voltage of non-resonance frequency is used to drive a piezoelectric transformer, so as to realize its advantages of increased power conversion efficiency, and that the driving circuit of piezoelectric transformer can be driven with a lower voltage. However, in the prior art, a coil-winding type transformer can be used for voltage transformation, therefore, the size of the entire driving device appears to be enormously large, and that is not compatible with the modern requirement of light weight, thin profile, and compact size. In addition, in performing voltage transformation, the coil-winding type transformer is liable to have magnetic core efficiency loss and thus its power output efficiency is reduced; moreover, the voltage endurance of coil winding is rather insufficient, such that it is liable to be broken through due to suddenly electric jump of power supply to a high voltage, thus resulting in short circuit and being burned out, as such it is highly hazardous.

In the prior art, the LEDs are lighted by the DC source with the charge pump circuit. However, when the amount of the LEDs increases, several integrated circuits with charge pump function have to be adopted. The cost price of the integrated circuit is high in the total driving circuit. Thus, the driving circuit of the large size of the LED panel is difficult to reduce the price.

SUMMARY OF THE INVENTION

In view of the problems and shortcomings of the prior art, the present invention discloses a lighting device implemented through utilizing an insulating type piezoelectric transformer in driving light-emitting-diodes (LEDs), so as to overcome the shortcomings and problems of the prior art.

A major objective of the present invention is to provide a lighting device implemented through utilizing an insulating type piezoelectric transformer in driving light-emitting-diodes (LEDs), Wherein, an insulation region on a substrate of an insulating type piezoelectric transformer is used to achieve an objective of insulating its primary side and secondary side, hereby reducing energy loss and raising its power conversion efficiency.

Another objective of the present invention is to provide a lighting device, wherein, an insulating type piezoelectric transformer is used to replace a coil-winding type transformer utilized in a conventional ordinary lighting device. In general, an insulating type piezoelectric transformer has the advantages of small leakage current, good insulation capability, high voltage endurance, low operation temperature, compact size, thin package profile, and high energy conversion efficiency. As such, in addition to raising the lighting efficiency, the size of the entire lighting device having LEDs can be reduced, thus the size of end product can be compact, so that it could have a good competitive edge in market competition.

Therefore, in order to achieve the above-mentioned objective, the present invention provides a lighting device implemented through utilizing an insulating type piezoelectric transformer in driving light-emitting-diodes (LEDs), comprising: a light-emitting-diode (LED) module, connected to at least an insulating type piezoelectric transformer. The LED module includes; a plurality of light-emitting-diodes of the first polarity and a plurality of light-emitting-diodes of the second polarity. The insulating type piezoelectric transformer includes a ceramic substrate, at least a first upper electrode and a first bottom electrode, at least a second upper electrode and a second bottom electrode. Wherein, the ceramic substrate is provided with an upper surface and a bottom surface. The first upper electrode and the first bottom electrode are located correspondingly to the upper surface and the bottom surface of the substrate respectively, and together they serve as a primary side, and it is used to receive a pulse voltage; while the second upper electrode and the second bottom electrode are located correspondingly to the upper surface and the bottom surface of the substrate respectively, and together they serve as a secondary side. An insulation region is disposed respectively between the first upper electrode and the second upper electrode, and the first bottom electrode and the second bottom electrode. The input pulse voltage at the primary side is converted to an AC voltage at the secondary side by the piezoelectric voltage transformation, and this AC voltage outputted from the secondary side is to drive the light-emitting-diodes of the first polarity or light-emitting-diodes of the second polarity into proceeding with lighting function. The AC voltage lighting source with applying the naturedly diode characteristics of LEDs can reduce the cost of the integrated circuits and also increase the efficiency because the external rectifier is not required.

Moreover, the present invention can additionally be provided with a filter-rectifier circuit and a piezoelectric capacitor, which are utilized in providing DC voltage for driving the light-emitting-diode module into proceeding with lighting function. The filter-rectifier circuit and the piezoelectric capacitor are connected in parallel, and filter-rectifier circuit is located on the secondary side, and is used to convert an AC voltage output by the secondary side into a DC voltage, and the DC voltage is provided through a piezoelectric capacitor for driving the light-emitting-diode module into proceeding with lighting function. Wherein, the light-emitting-diode (LED) module is formed by a plurality of light-emitting-diodes of the same polarity connected in parallel.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed descriptions with reference to the attached drawings.

Figure 1:
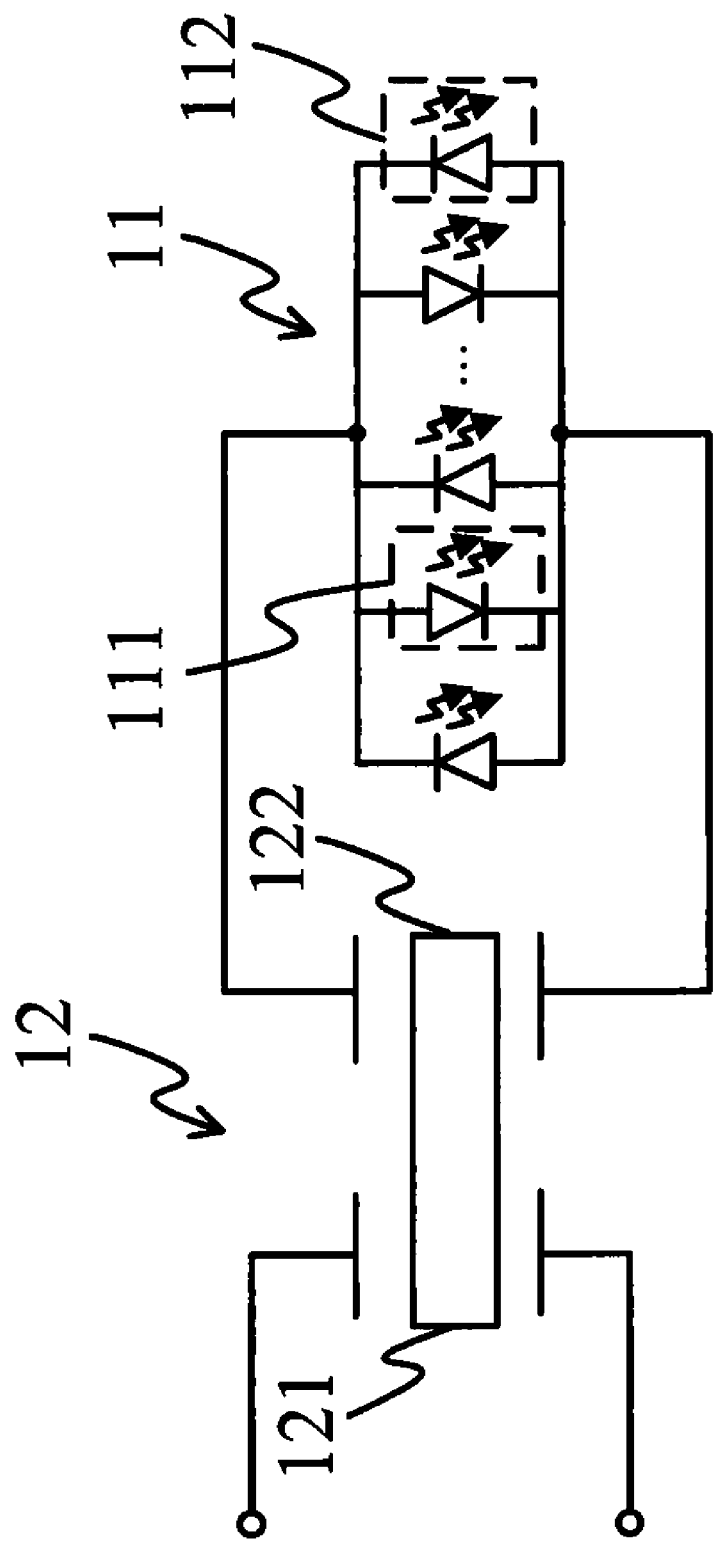
FIG. 1 is a schematic diagram of a lighting device implemented through utilizing an insulating type piezoelectric transformer in driving light-emitting-diodes (LEDs) according to a first embodiment of the present invention.

Refer to FIG. 1 for a schematic diagram of a lighting device implemented through utilizing an insulating type piezoelectric transformer in driving light-emitting-diodes (LEDs) according to a first embodiment of the present invention. In the present embodiment, the lighting device is an AC type lighting device. As shown in FIG. 1, the lighting device of the present invention comprises: a light-emitting-diode (LED) module 11 and at least an insulating type piezoelectric transformer 12. The LED module includes: a plurality of light-emitting-diodes 111 of the first polarity and a plurality of light-emitting-diodes 112 of the second polarity connected together in parallel. Wherein, the polarity of a plurality of light-emitting-diodes 111 of the first polarity is opposite to that of a plurality of light-emitting-diodes 112 of the second polarity, and they can be arranged alternatively and then connected in parallel to form a light-emitting-diode (LED) module 11. The insulating type piezoelectric transformer 12 is composed of a primary side 121 and a secondary side 122. Wherein, the primary side 121 is used to receive a pulse voltage, and that is converted into an AC voltage in a piezoelectric voltage transformation way, and the AC voltage is output through the secondary side 122 in driving the light-emitting-diode module 11 into proceeding with lighting function.

When an insulating type piezoelectric transformer 12 is operated at resonance frequency, and the input pulse voltage is at its positive half cycle, the primary side 121 of the insulating type piezoelectric transformer 12 is used to receive the input pulse voltage, and that is transformed into an AC voltage through a piezoelectric effect, and the AC voltage is output through the secondary side 122 in driving the light-emitting-diodes 111 of the first polarity into proceeding with lighting function. Wherein, the light-emitting-diode is provided with the characteristic of single direction conduction, such that at this time, the light-emitting-diodes 111 of the first polarity are forward biased, so current flows through the light-emitting-diodes 111 of the first polarity, thus driving the light-emitting-diodes 111 of the first polarity into proceeding with lighting function. Meanwhile, the light-emitting-diodes 112 of the second polarity are reverse biased, and it is in an equivalent open circuit state, therefore, there is no current flowing through. On the other hand, when the input pulse voltage is at its negative half cycle, an AC voltage is output from the secondary side 122 in driving the light-emitting-diodes 112 of the second polarity into proceeding with lighting function. Wherein, the light-emitting-diodes 112 of the second polarity is forward biased, so current flows through the light-emitting-diodes 112 of the second polarity, thus driving the light-emitting-diodes 112 of the second polarity into proceeding with lighting function. At this time, the light-emitting-diodes 111 of the first polarity are reverse biased, and it is in an equivalent open circuit state, therefore, there is no current flowing through.

Figure 2A:
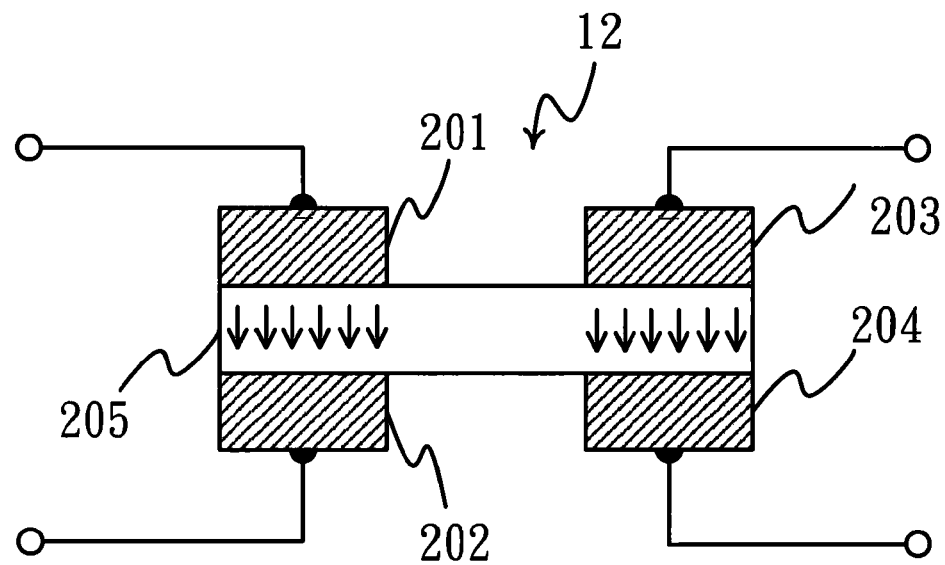
FIG. 2A is a cross section view of an insulating type piezoelectric transformer according to an embodiment of the present invention.
Figure 2B:
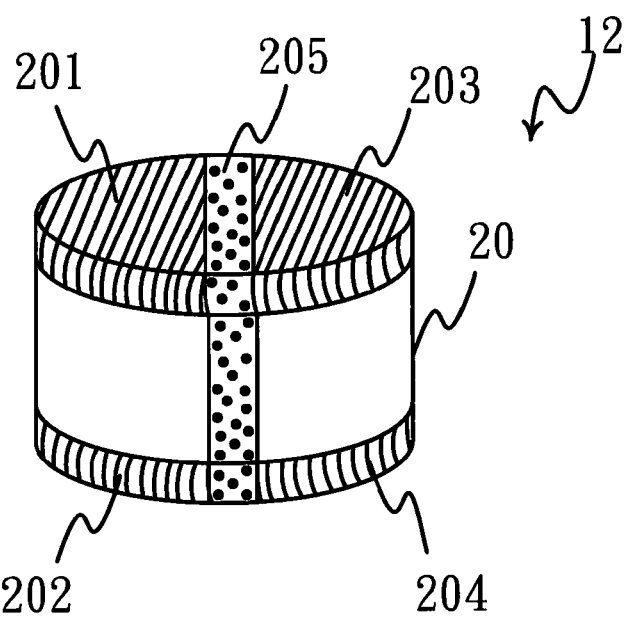
FIG. 2B is a schematic diagram of element structure of an insulating type piezoelectric transformer according to an embodiment of the present invention.
Figure 2C:
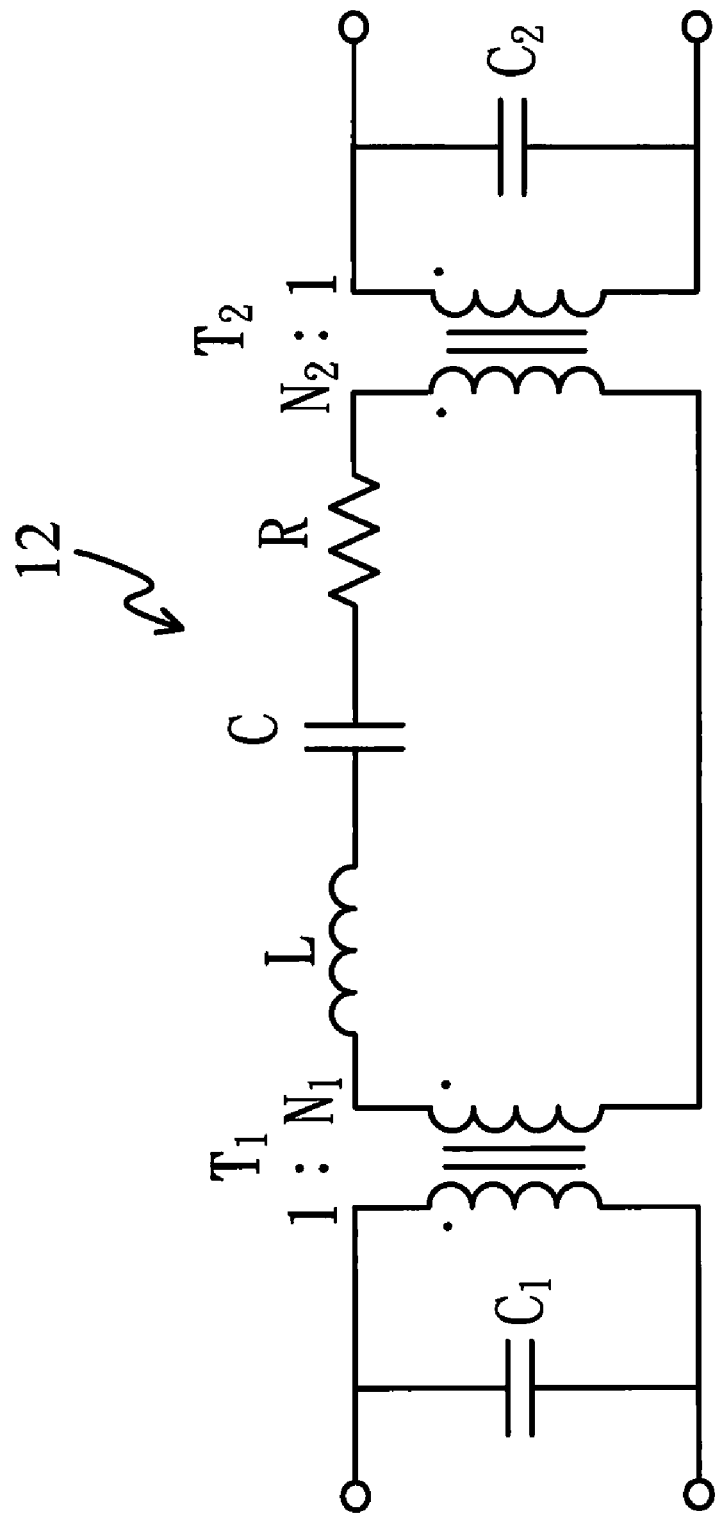
FIG. 2C is a circuit diagram of an equivalent circuit of an insulating type piezoelectric transformer according to an embodiment of the present invention.

Refer to FIG. 2 (A) for a cross section view of an insulating type piezoelectric transformer according to an embodiment of the present invention. Also, refer to FIG. 2 (B) for a schematic diagram of element structure of an insulating type piezoelectric transformer according to an embodiment of the present invention. As shown in FIGS. 2 (A) and 2 (B), the insulating type piezoelectric transformer 12 comprises: a ceramic substrate 20, at least a first upper electrode 201 and a first bottom electrode 202, at least a second upper electrode 203 and a second bottom electrode 204. The ceramic substrate 20 is provided with an upper surface and a bottom surface. The first upper electrode 201 and the first bottom electrode 202 are located correspondingly to the upper surface and the bottom surface of the ceramic substrate 20 respectively, and together they serve as a primary side; while the second upper electrode 203 and the second bottom electrode 204 are located correspondingly to the upper surface and the bottom surface of the ceramic substrate 20 respectively, and together they serve as a secondary side. An insulation region 205 is disposed respectively between the first upper electrode 201 and the second upper electrode 203, and the first bottom electrode 202 and the second bottom electrode 204. In a piezoelectric process, the input pulse voltage is converted to an AC voltage of different magnitude by the primary side and the secondary side in a piezoelectric transformation way, and that will polarize separately the ceramic substrate 20 between the first upper electrode 201, the first bottom electrode 202, and the ceramic substrate 20 between the second upper electrode 203 and the second bottom electrode 204. The insulation region 205 is formed into a non-polarized region, while keeping the physical property of ceramic material, hereby presenting an insulation state. Wherein, when it is operated at a resonance frequency range, the impedance of the insulation region 205 is at its minimum. In other words, when the insulation region 205 is operated at a non-resonance frequency range, its impedance is at its maximum, and that can reach as high as $10^{12}$□$10^{13}$ ohms and presenting high impedance state (insulation state). As such, this could achieve the efficacy of insulating the primary side and the secondary side, thus being able to reduce or prevent the sine wave components other than the resonance frequency from entering into the secondary side in creating loss of energy.

Subsequently, refer to FIG. 2 (C) for a circuit diagram of an equivalent circuit of an insulating type piezoelectric transformer according to an embodiment of the present invention. As shown in FIG. 2 (C), in the equivalent circuit is shown on its primary side: an equivalent capacitor $C_1$, a transformer $T_1$; and an equivalent inductor L, an equivalent capacitor C, and equivalent resistor R connected in series; and is shown on its secondary side an equivalent capacitor $C_2$ and a transformer $T_2$. The operating frequency of the piezoelectric transformer is near its structure resonance frequency because the energy conversion efficiency and the lighting efficiency are both high in this frequency range. The input electric energy transfers to the mechanical energy by the field transformer $T_1$. Then, the piezoelectric transformer transfers the energy from the primary side to the secondary side by the vibration at the structure resonance. The equivalent inductor L, an equivalent capacitor C, and equivalent resistor R with series connection represents the mention structure vibration at resonance. Finally, the field transformer $T_2$ collects the vibration energy and transfers the vibration energy to the electric energy. Typical transformer uses the magnetic filed to transfer the energy but the magnetic field is not easy to enclose in the ferrite core, which leads to the leakage energy. The vibration energy is enclosed in the structure. This fact causes the piezoelectric transformer can transfer the energy more efficient compared to the electromagnetic transformer.

Figure 3:
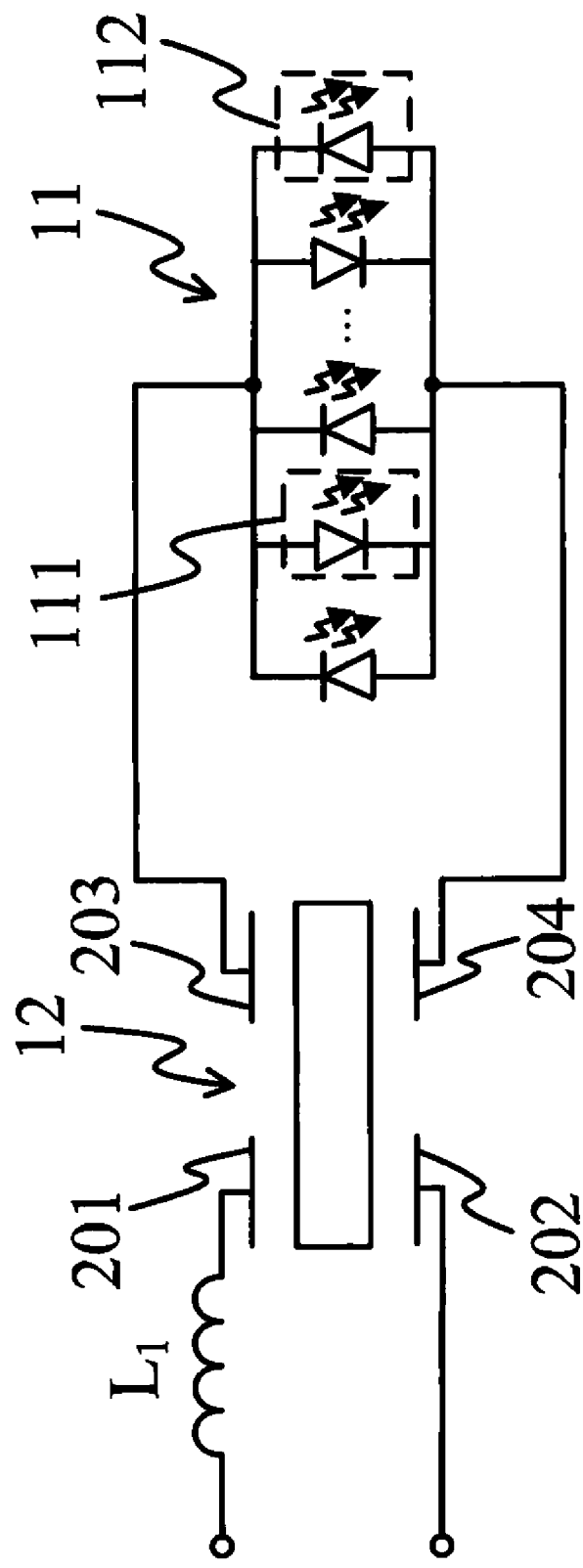
FIG. 3 is a schematic diagram of a lighting device implemented through utilizing an insulating type piezoelectric transformer in driving light-emitting-diodes (LEDs) according to a second embodiment of the present invention.

Refer to FIG. 3 for a schematic diagram of a lighting device implemented through utilizing an insulating type piezoelectric transformer in driving light-emitting-diodes (LEDs) according to a second embodiment of the present invention. As shown in FIG. 3, its difference with FIG. 1 is that, a resonance inductor L1 is additionally added, and that is connected in series with a first upper electrode 201 on the primary side of the insulating type piezoelectric transformer 12 to form a half bridge resonance circuit. The light-emitting-diode (LED) module 11 is formed by a plurality of light-emitting-diodes 111 of the first polarity and a plurality of light-emitting-diodes 112 of the second polarity connected in parallel. The polarity of the light-emitting-diodes 111 of the first polarity is opposite to that of the light-emitting-diodes 112 of the second polarity. When it is operated at the resonance frequency of the resonance inductor L1 and the insulating type piezoelectric transformer 12, and the input pulse voltage is at its positive half cycle, the primary side 121 of the insulating type piezoelectric transformer 12 receives an input pulse voltage through the resonance inductor L1, and the input pulse voltage is converted into an AC voltage in a piezoelectric voltage transformation way, at this time, the intrinsic impedance is at its minimum, and the current flowing through is at its maximum, therefore, the energy conversion efficiency is at its best. Then, the AC voltage thus obtained is output from the secondary side 122 of the insulating type piezoelectric transformer 12, hereby driving light-emitting-diodes 111 of the first polarity into proceeding with the lighting function. Wherein, the resonance inductor L1 is capable of boosting voltage and storing energy for the input pulse voltage, therefore, it can provide the insulating type piezoelectric transformer 12 with higher power conversion efficiency. On the other hand, in case that the input pulse voltage is at its negative half cycle, the primary side 121 of the insulating type piezoelectric transformer 12 receives the input pulse voltage through the resonance inductor L1, and the input pulse voltage is converted into an AC voltage in a piezoelectric voltage transformation way, then, the AC voltage thus obtained is output from the secondary side 122 of the insulating type piezoelectric transformer 12, hereby driving light-emitting-diodes 112 of the second polarity into proceeding with lighting function.

Figure 4:
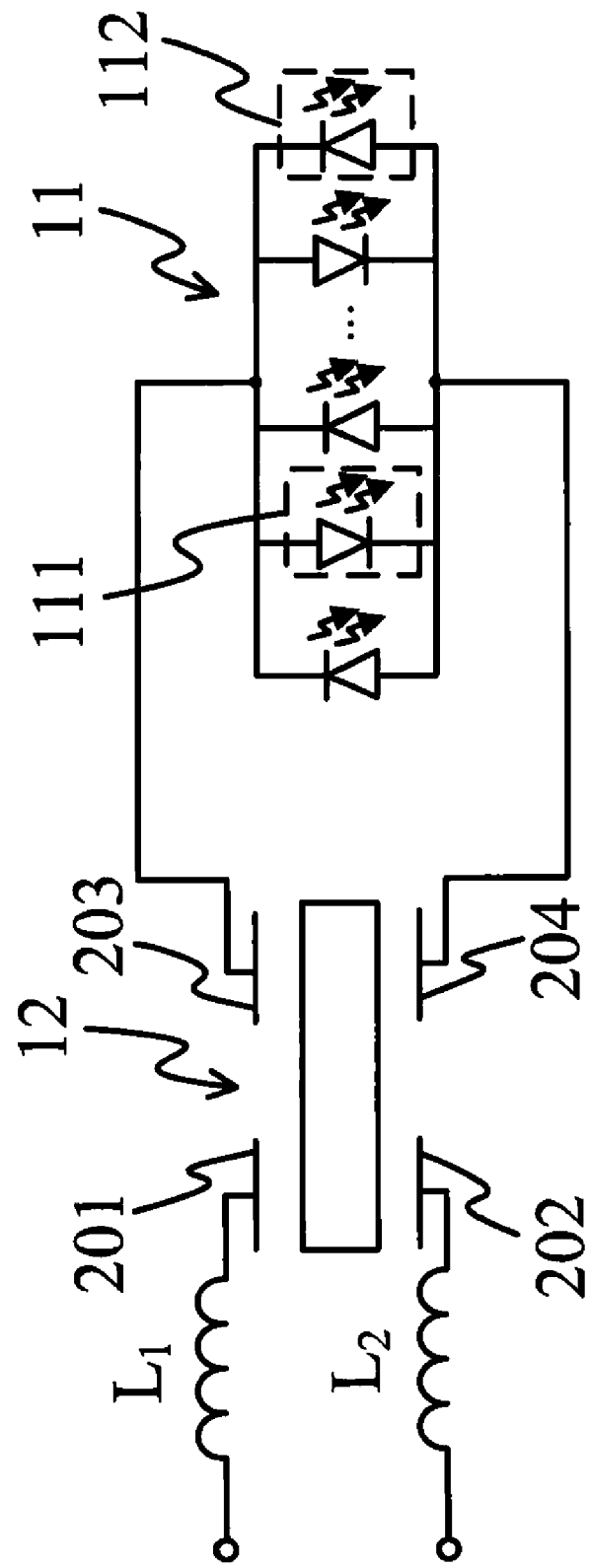
FIG. 4 is a schematic diagram of a lighting device implemented through utilizing an insulating type piezoelectric transformer in driving light-emitting-diodes (LEDs) according to a third embodiment of the present invention.

In case that it is desired to raise the power output of the entire light-emitting-diode module 11, refer to FIG. 4 for a schematic diagram of a lighting device implemented through utilizing an insulating type piezoelectric transformer in driving light-emitting-diodes (LEDs) according to a third embodiment of the present invention. As shown in FIG. 4, in the present embodiment, two resonance inductors L1 and L2 are added. The resonance inductors L1 and L2 are connected separately in series with a first upper electrode 201 and a first bottom electrode 202 on the primary side of an insulating type piezoelectric transformer 12 to form a full bridge resonance circuit. The light-emitting-diodes 111 of the first polarity and the light-emitting-diodes 112 of the second polarity are connected separately to a second upper electrode 203 and a second 1 bottom electrode 204 of an insulating type piezoelectric transformer 12. When it is operated at the resonance frequency of the resonance inductors L1, L2 and the insulating type piezoelectric transformer 12, and the input pulse voltage is at its positive half cycle, the first upper electrode 201 of the primary side is positive, and the first bottom electrode 202 is negative. The primary side receives an input pulse voltage through the resonance inductors L1 and L2, and the resonance inductors L1 and L2 are capable of boosting voltage storing energy and filter out the high-frequency noise for the input pulse voltage, therefore, it can provide the insulating type piezoelectric transformer 12 with higher power conversion efficiency, and the input pulse voltage can be converted into an AC voltage in a piezoelectric voltage transformation way. At this time, the second upper electrode 203 on the secondary side of the insulating type piezoelectric transformer 12 is positive, and the second bottom electrode 204 is negative. Therefore, the AC voltage output from the second upper electrode 203 is used to drive the forward biased light-emitting-diodes 111 of the first polarity into proceeding with lighting function. On the other hand, in case that the input pulse voltage is at its negative half cycle, then the first bottom electrode 202 of the primary side is positive, and the first upper electrode 201 is negative. The primary side receives an input pulse voltage through the resonance inductors L1 and L2, and the input pulse voltage can be converted into an AC voltage in a piezoelectric voltage transformation way. At this time, the second bottom electrode 204 on the secondary side of the insulating type piezoelectric transformer 12 is positive, and the second upper electrode 203 is negative. Therefore, the AC voltage output from the second upper electrode 203 is used to drive the forward biased light-emitting-diodes 112 of the second polarity into proceeding with lighting function. Through the above description, it is evident that, in the present invention, when operated at resonance frequency in a bandwidth range, a full-bridge resonance circuit can provide more output power than a half-bridge resonance circuit.

Figure 5:
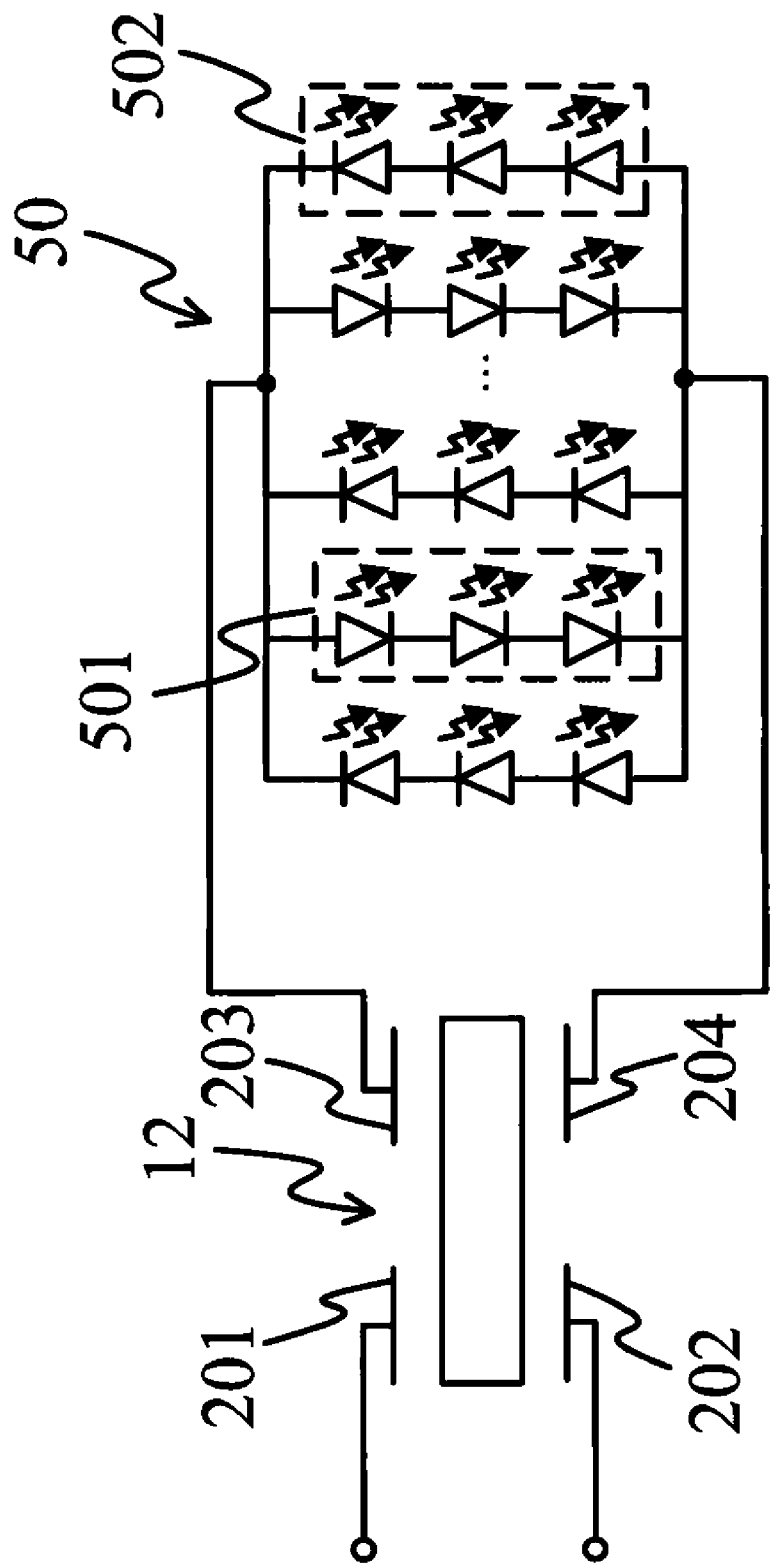
FIG. 5 is a schematic diagram of a lighting device implemented through utilizing an insulating type piezoelectric transformer in driving light-emitting-diodes (LEDs) according to a fourth embodiment of the present invention.
Figure 6:
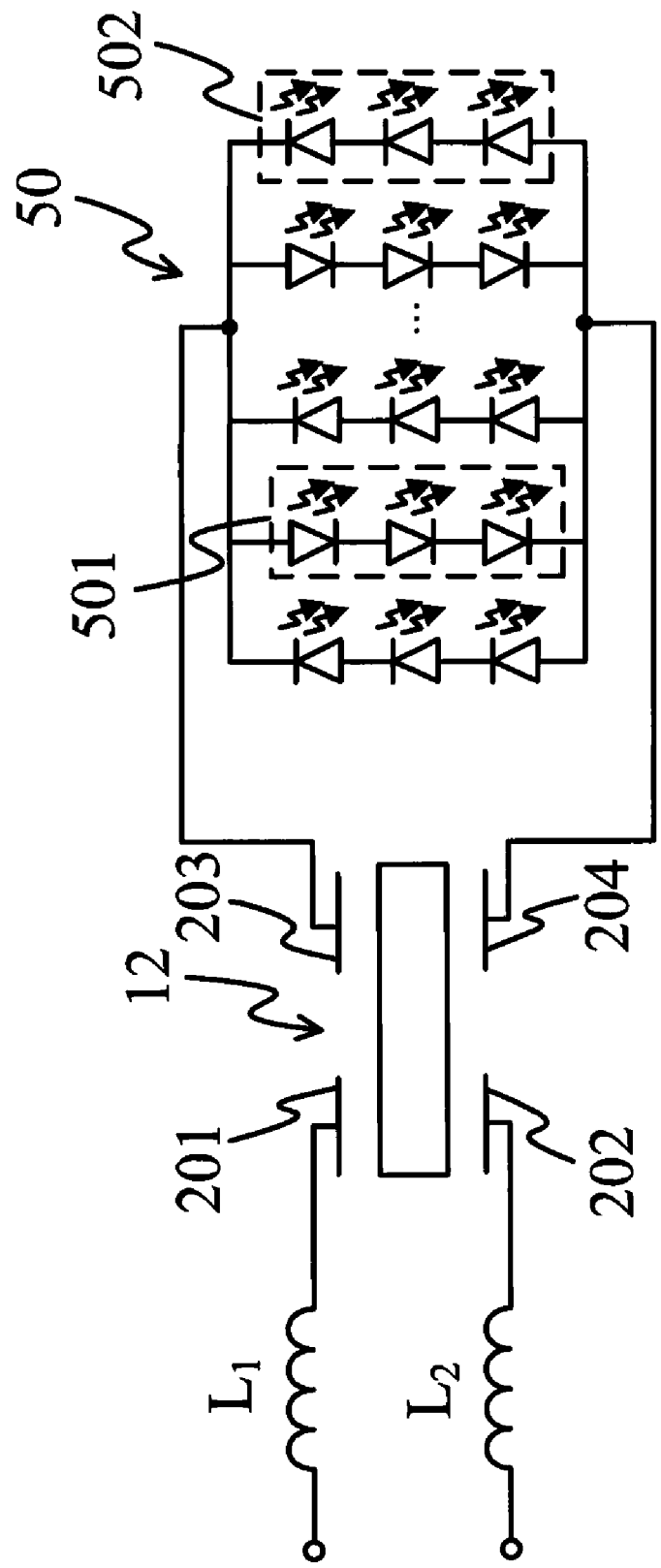
FIG. 6 is a schematic diagram of a lighting device implemented through utilizing an insulating type piezoelectric transformer in driving light-emitting-diodes (LEDs) according to a fifth embodiment of the present invention.

Refer to FIG. 5 for a schematic diagram of a lighting device implemented through utilizing an insulating type piezoelectric transformer in driving light-emitting-diodes (LEDs) according to a fourth embodiment of the present invention. As shown in FIG. 5, a lighting device comprises: at least a light-emitting-diode (LED) module 50 and at least an insulating type piezoelectric transformer 12. The light-emitting-diode (LED) module is formed by parallel connecting a plurality of first LED light strings 501 and a plurality of second LED light strings 502. Each of the first LED light strings 501 includes a plurality of light-emitting-diodes of the first polarity, and each of the second LED light strings 502 includes a plurality of light-emitting-diodes of the second polarity. The first LED light strings 501 and the second LED light strings 502 are connected respectively to a second upper electrode 203 and a second bottom electrode 204. Wherein, the polarity of the first LED light string 501 is opposite to that of the second LED light string 502, and they can be arranged alternatively and then connected in parallel to form a light-emitting-diode (LED) module 50. When it is operated at the resonance frequency of the insulating type piezoelectric transformer 12, and the input pulse voltage is at its positive half cycle, at this time, the first upper electrode 201 on the primary side of the insulating type piezoelectric transformer 12 is positive, and the first bottom electrode 202 is negative. The primary side receives an input pulse voltage, and this input pulse voltage is converted into an AC voltage in a piezoelectric voltage transformation way. At this time, the second upper electrode 203 of the insulating type piezoelectric transformer 12 is positive, and the second bottom electrode 204 is negative. Therefore, the AC voltage output from the second upper electrode 203 is used to drive the forward biased first LED light strings 501 into proceeding with lighting function. On the other hand, in case that the input pulse voltage is at its negative half cycle, then the first bottom electrode 202 on the primary side of the insulating type piezoelectric transformer 12 is positive, and the first upper electrode 201 is negative, the second bottom electrode 204 on the secondary side is positive, and the second upper electrode 203 is negative. Therefore, the AC voltage output from the second upper electrode 203 is used to drive the forward biased second LED light strings 502 into proceeding with lighting function. In the present embodiment, in case that the insulating type piezoelectric transformer 12 is arranged to form a full-bridge resonance circuit in cooperation with two resonance inductors L1 and L2, then it could provide higher power output, as shown in FIG. 6.

Figure 7:
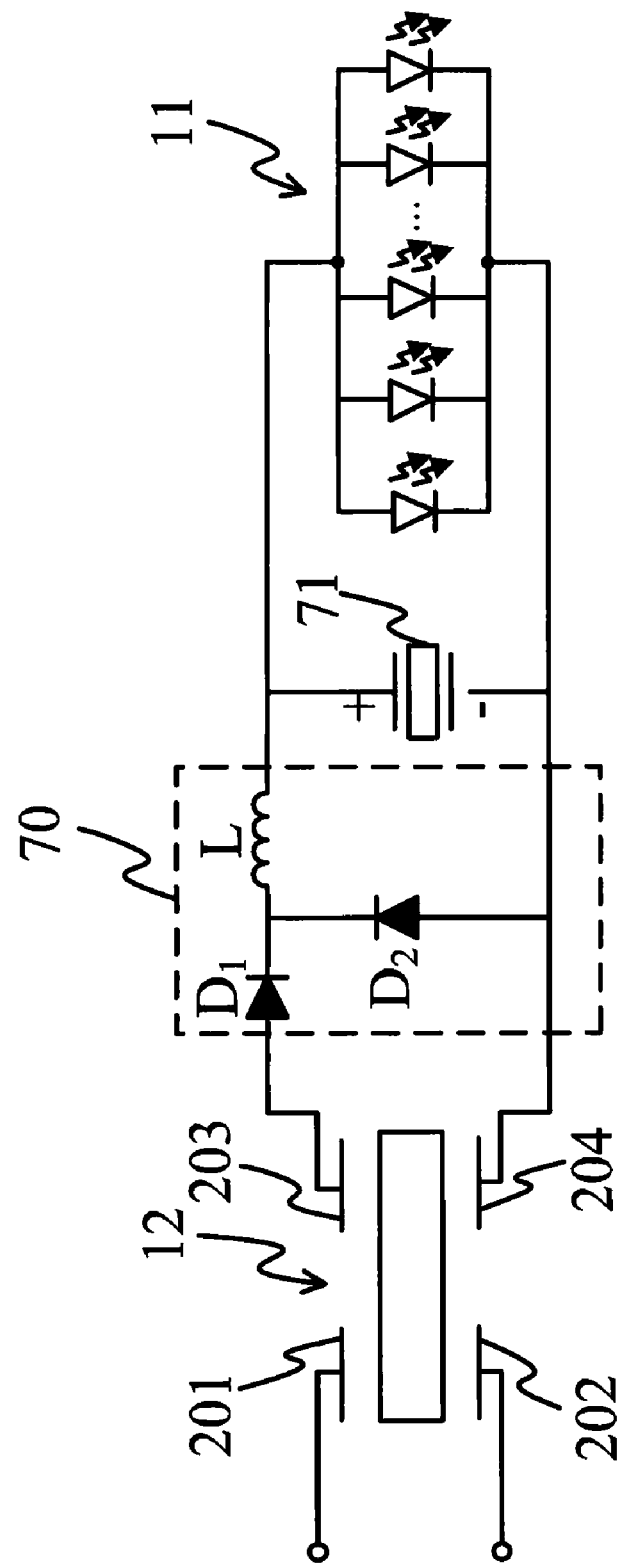
FIG. 7 is a schematic diagram of a lighting device implemented through utilizing an insulating type piezoelectric transformer in driving light-emitting-diodes (LEDs) according to a sixth embodiment of the present invention.

In the present invention, in addition to driving an LED module with an AC voltage, a DC voltage can also be used to drive an LED module. Refer to FIG. 7 for a schematic diagram of a lighting device implemented through utilizing an insulating type piezoelectric transformer in driving light-emitting-diodes (LEDs) according to a sixth embodiment of the present invention. As shown in FIG. 7, in the present embodiment, a filter-rectifier circuit 70 and a piezoelectric capacitor 71 can be added. The filter-rectifier circuit 70 and the piezoelectric capacitor 71 are connected in parallel. The filter-rectifier circuit 70 is located on the secondary side of an insulating type piezoelectric transformer 12, and the piezoelectric capacitor 71 is used to provide a DC voltage in driving light-emitting-diode module 11 into proceeding with lighting function. The filter-rectifier circuit 70 includes diodes D1 and D2 and a filter inductor L. The filter inductor L is connected to diodes D1 and D2, and diodes D1 and D2 are connected respectively to a second upper electrode 203 and a second bottom electrode 204.

When it is operated at the resonance frequency of the insulating type piezoelectric transformer 12, and the input pulse voltage is at its positive half cycle, at this time, the first upper electrode 201 on the primary side of the insulating type piezoelectric transformer 12 is positive, and the first bottom electrode 202 is negative. The primary side receives an input pulse voltage, and this input pulse voltage is converted into an AC voltage in a piezoelectric voltage transformation way. At this time, the second upper electrode 203 of the insulating type piezoelectric transformer 12 is positive, and the second bottom electrode 204 is negative. Therefore, the AC voltage output from the second upper electrode 203 is used to drive the forward biased diode D1, thus a current can flow from diode D1 to a piezoelectric capacitor 71 via a filter inductor 111 to proceed with the charging of piezoelectric capacitor 71, and at this time, diode D2 is reverse biased, and it is in an equivalent open circuit state, thus there is no current flowing through. On the other hand, in case that the input pulse voltage is at its negative half cycle, then the first bottom electrode 202 on the primary side is positive, and the first upper electrode 201 is negative, the second bottom electrode 204 on the secondary side is positive, and the second upper electrode 203 is negative, therefore, the AC voltage output from the second bottom electrode 204 is used to drive the forward biased diode D2, thus a current can flow from diode D2 to a piezoelectric capacitor 71 via a filter inductor L to proceed with the charging of piezoelectric capacitor 71, and at this time, diode D1 is reverse biased, and it is in an equivalent open circuit state, thus there is no current flowing through. Due to the single direction electrical conduction characteristic of diodes D1 and D2, thus an AC voltage of alternating magnitudes and directions can be converted into a DC voltage, then the DC voltage is output from the piezoelectric capacitor 71 in driving LED module 11 into proceeding with lighting function. In the present embodiment, the light-emitting-diode (LED) module 11 is formed by a plurality of single light-emitting-diodes of the same polarity connected together in parallel, and a DC current is provided by the piezoelectric capacitor 71 in driving the light-emitting-diode (LED) module 11 into proceeding with lighting function. Of course, the light-emitting-diode (LED) module 11 can be formed by a plurality of LED light strings 113 of the same polarity connected together in parallel, and each of the LED light strings 113 can be formed by a plurality of light-emitting-diodes of the same polarity connected in series, as shown in FIG. 8.

Figure 8:
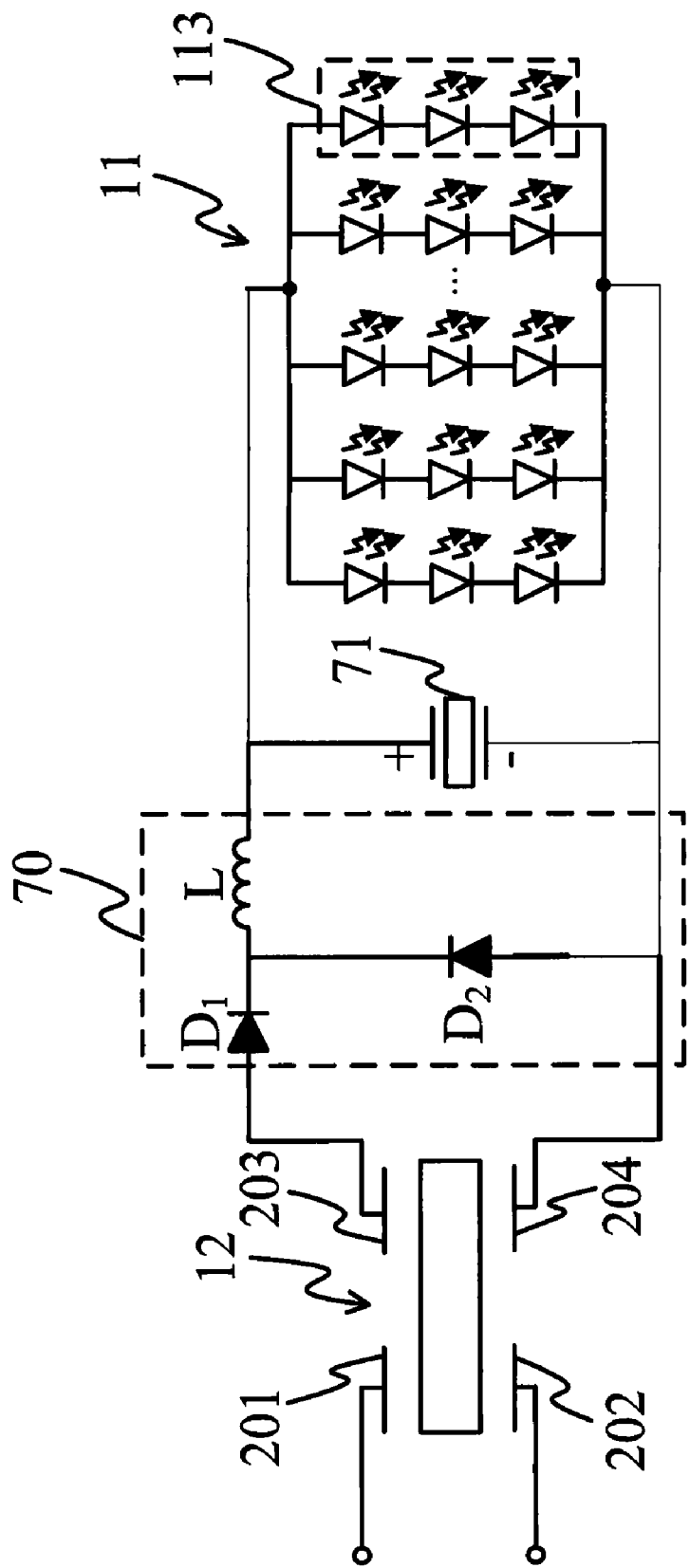
FIG. 8 is a schematic diagram of a lighting device implemented through utilizing an insulating type piezoelectric transformer in driving light-emitting-diodes (LEDs) according to a seventh embodiment of the present invention.

In addition, as shown in FIGS. 7 & 8, in the present invention, depending on actual requirements, an insulating type piezoelectric transformer 12 can be arranged to match with a resonance inductor L1 to form a half-bridge resonance circuit, so as to raise power in driving a light-emitting-diode (LED) module. Of course, in case that an insulating type piezoelectric transformer 12 is arranged to match with two resonance inductors L1 and L2 to form a full-bridge resonance circuit, then it can be used to drive an output load requiring larger power.

Summing up the above, the insulating type piezoelectric transformer of the present invention is made of ceramic material, that is highly voltage endurance and is able to endure an AC voltage of about 3000 V, such that it can be used to replace the conventional coil-winding type transformer, in overcoming the shortcomings of the coil-winding type transformer that, in operations, its power conversion efficiency will be lowered due to efficiency loss of magnetic core, the voltage endurance of its coil-windings is not sufficient, and it tends to be broken-through due to a sudden jump of a power supply to a high voltage, thus resulting in its short circuit and burning out; and the insulating type piezoelectric transformer may also solve the problem of the conventional coil-winding type transformer of prior art that, when the voltage of an input signal is overly high, the vibration of coil-winding type transformer could be too violent, hereby resulting in the breakdown or damage of that transformer. Moreover, when it is operated at a non-resonance frequency in a bandwidth range, the impedance of an insulating type piezoelectric transformer of the present invention can reach as high as $10^{12}$~$10^{13}$ ohms, hereby effectively reducing energy loss, raising power conversion efficiency, and optimizing lighting efficiency. In addition, due to the compact size and thin profile of the insulating type piezoelectric transformer, the overall size and production cost of the lighting device utilizing LEDs can be effectively reduced, thus highlighting its design advantage of light-weight, thin-profile, and compact-size. Therefore, the lighting device of the present invention does have a good competitive edge in market competition.

The above detailed description of the preferred embodiments is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A lighting device implemented through utilizing an insulating type piezoelectric transformer in driving light-emitting-diodes (LEDs), comprising:
    a light-emitting-diode (LED) module comprising a plurality of LEDs of a first polarity and a plurality of LEDs of a second polarity; and
    at least an insulating type piezoelectric transformer, connected to said LED module, and said insulating type piezoelectric transformer includes:
    a ceramic substrate, having an upper surface and a bottom surface,
    at least a first upper electrode and a first bottom electrode, located correspondingly to said upper surface and said bottom surface of said ceramic substrate respectively to serve as a primary side, and is used to receive a pulse voltage, and
    at least a second upper electrode and a second bottom electrode, located correspondingly to said upper surface and said bottom surface of said ceramic substrate respectively to serve as a secondary side, and an insulation region is disposed between said first upper electrode and said second upper electrode, and between said first bottom electrode and said second bottom electrode, said pulse voltage is converted into an AC voltage by said primary side and said secondary side in a piezoelectric voltage transformation way, said AC voltage is output from said secondary side in driving said LEDs of a first polarity and said LEDs of a second polarity into proceeding with lighting function.

2. The lighting device implemented through utilizing an insulating type piezoelectric transformer in driving light-emitting-diodes (LEDs) as claimed in claim 1, wherein when said insulation region is operated at a non-resonance frequency in a bandwidth range, an impedance of said insulation region is about $10^{12}$~$10^{13}$ ohms.

3. The lighting device implemented through utilizing an insulating type piezoelectric transformer in driving light-emitting-diodes (LEDs) as claimed in claim 1, further comprising:
    a filter-rectifier circuit and a piezoelectric capacitor, said filter-rectifier circuit is connected in parallel with said piezoelectric capacitor, said filter-rectifier circuit is located on said secondary side, and is used to convert said AC voltage output by said secondary side into a DC voltage, and said DC voltage is provided through said piezoelectric capacitor in driving said LED module into proceeding with lighting function.

4. The lighting device implemented through utilizing an insulating type piezoelectric transformer in driving light-emitting-diodes (LEDs) as claimed in claim 1, wherein said LED module comprises said plurality of LEDs of said first polarity and said plurality of LEDs of said second polarity connected together in parallel, said polarity of said LEDs of said first polarity is opposite to that of said LEDs of said second polarity.

5. The lighting device implemented through utilizing an insulating type piezoelectric transformer in driving light-emitting-diodes (LEDs) as claimed in claim 1, wherein said LED module comprises a plurality of first LED light strings and a plurality of second LED light strings connected together in parallel, each of said first LED light strings includes LEDs of said first polarity, and each of said second LED light strings includes LEDs of said second polarity, and said polarity of said first LED light strings is opposite to that of said second LED light strings.

6. The lighting device implemented through utilizing an insulating type piezoelectric transformer in driving light-emitting-diodes (LEDs) as claimed in claim 1, wherein said AC voltage output from said secondary side is used to drive said LEDs of said first polarity into proceeding with lighting function in its positive half cycle, and is used to drive said LEDs of said second polarity into proceeding with lighting function in its negative half cycle.

7. The lighting device implemented through utilizing an insulating type piezoelectric transformer in driving light-emitting-diodes (LEDs) as claimed in claim 3, wherein said LED module is formed by a plurality of LED light strings of said same polarity connected in parallel, each of said LED light strings contains a plurality of LEDs of said same polarity, and said DC voltage is provided through said piezoelectric capacitor in driving said LED light strings into proceeding with lighting function simultaneously.

8. The lighting device implemented through utilizing an insulating type piezoelectric transformer in driving light-emitting-diodes (LEDs) as claimed in claim 3, wherein said LED module is formed by a plurality of single LEDs of a same polarity connected together in parallel, and said DC voltage is provided through said piezoelectric capacitor in driving said plurality of single LEDs into proceeding with lighting function simultaneously.

* * * * *